(12) United States Patent
Gillett et al.

(10) Patent No.: US 8,382,202 B2
(45) Date of Patent: Feb. 26, 2013

(54) STACKABLE CHILD SAFETY SEAT

(75) Inventors: Michael H. Gillett, Mohnton, PA (US);
Joseph F. Fiore, Jr., Lebanon, PA (US);
Guang-Hui Zhao, Central Hong Kong (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 142 days.

(21) Appl. No.: 12/978,741

(22) Filed: Dec. 27, 2010

(65) Prior Publication Data

US 2011/0291450 A1    Dec. 1, 2011

Related U.S. Application Data

(60) Provisional application No. 61/348,548, filed on May 26, 2010.

(51) Int. Cl.
*A47D 1/10* (2006.01)
*A47C 3/04* (2006.01)
*A47C 7/62* (2006.01)

(52) U.S. Cl. .............. 297/256.16; 297/188.14; 297/239; 297/250.1

(58) Field of Classification Search .................. 297/239, 297/250.1, 256.16
See application file for complete search history.

(56) References Cited

U.S. PATENT DOCUMENTS

| | | | |
|---|---|---|---|
| 3,709,326 A * | 1/1973 | Habgood, Jr. | 206/386 |
| 3,874,726 A * | 4/1975 | Sebel et al. | 297/239 |
| 4,275,923 A * | 6/1981 | Molnar | 297/250.1 |
| 4,341,419 A | 7/1982 | Sebel | |
| 4,662,678 A * | 5/1987 | Halpert | 297/239 |
| D376,917 S * | 12/1996 | Kain | D6/333 |
| 5,797,654 A * | 8/1998 | Stroud | 297/250.1 X |
| 6,676,213 B1 | 1/2004 | Dlugos | |
| 7,011,368 B2 * | 3/2006 | Barth et al. | 297/239 |
| 8,091,965 B2 * | 1/2012 | Flannery et al. | 297/256.16 |
| 8,240,762 B2 * | 8/2012 | Herzberg | 297/256.16 |
| 8,267,473 B2 * | 9/2012 | Flannery et al. | 297/256.16 |
| 2005/0099046 A1 | 5/2005 | Barth et al. | |
| 2006/0138848 A1 | 6/2006 | Balensiefer et al. | |
| 2008/0191530 A1 | 8/2008 | Basham | |
| 2011/0133533 A1 * | 6/2011 | Herzberg | 297/250.1 |
| 2011/0241388 A1 * | 10/2011 | Kemp et al. | 297/250.1 |
| 2012/0104816 A1 * | 5/2012 | Flannery et al. | 297/250.1 |
| 2012/0175922 A1 * | 7/2012 | Gillett et al. | 297/250.1 X |

FOREIGN PATENT DOCUMENTS

| | | |
|---|---|---|
| GB | 2447708 A | 9/2008 |
| WO | 2010039747 A2 | 4/2010 |

* cited by examiner

*Primary Examiner* — Rodney B White
(74) *Attorney, Agent, or Firm* — Baker & McKenzie LLP

(57) ABSTRACT

A child safety seat can be formed in a single body, and comprises a seating portion having an upper surface and opposite bottom surface, and two armrests projecting upward at left and right sides of the seating portion, the upper surface having left and right front corners provided with lobe portions, and the bottom surface having recessed portions respectively corresponding to the locations of the lobe portions. Each of the recessed portions has a shape that can fit with the shape of each of the lobe portions. When two instances of the seats are stacked on each other, the lobe portions of the lower seat are respectively fitted at least partially into the recessed portions of the upper seat, and the tapered inner surfaces of the armrests on the lower seat are in contact with the tapered outer surfaces of the armrests of the upper seat.

22 Claims, 8 Drawing Sheets

STACKABLE CHILD SAFETY SEAT

CROSS-REFERENCE TO RELATED APPLICATION

This application claims priority to U.S. Provisional Application No. 61/348,548 filed on May 26, 2010.

BACKGROUND OF THE INVENTION

1. Field of the Invention

The present invention relates to child safety seats, and more particularly to child safety seats that are stackable on one another.

2. Description of the Related Art

The structure of a conventional child safety seat usually requires that the seat article be packaged or disposed individually for shipment and storage. As a result, substantial space may be wasted, which increases shipment and storage costs. Moreover, because the packaging case for the seat article is relatively large and heavy in weight, handling of the packaging case at the point of sales or by the consumer may be cumbersome.

Therefore, there is a need for a seat design that can address at least the foregoing issues.

SUMMARY

The present application describes a child safety seat structure that allows convenient stacking arrangement. Such arrangement of multiple seats can reduce the storage space. Costs related to shipment and storage of the seat articles can thereby be reduced. In one embodiment, the child safety seat can be formed in a single body, and comprises a seating portion having an upper surface and opposite bottom surface, and two armrests projecting upward at left and right sides of the seating portion, the upper surface of the seating portion having left and right front corners respectively provided with lobe portions, and the bottom surface having recessed portions respectively corresponding to the locations of the lobe portions, wherein each of the recessed portions has a shape that is adapted to fit with the shape of each of the lobe portions.

In other embodiments, an arrangement of multiple child safety seats is described. The arrangement of multiple child safety seats comprises a first and a second seat stacked on each other, wherein each of the first and the second seat includes a seating portion having an upper surface and opposite bottom surface, and two armrests projecting upward at left and right sides of the seating portion, the upper surface of the seating portion having left and right front corners respectively provided with lobe portions, the bottom surface having recessed portions respectively corresponding to the locations of the lobe portions, and each of the armrests includes tapered inner surfaces and tapered outer surfaces. The first and second seats are stacked on each other such that the lobe portions of the second seat are fitted at least partially into the recessed portions of the first seat, and the tapered inner surfaces of the armrests on the second seat contact with the tapered outer surfaces of the armrests on the first seat.

At least one advantage of the construction described herein is the ability to stack multiple child safety seats in a convenient manner. Because the stacked seats can engage adjacently with each other in a tight manner, the occurrence of accidental fall of one or more seats can be reduced, and the whole stack of seats can be handled in a convenient manner.

DETAILED DESCRIPTION OF THE EMBODIMENTS

The present application describes a child safety seat structure that allows convenient stacking arrangement. Such arrangement of multiple seats can reduce the storage space. Costs related to shipment and storage of the seat articles can thereby be reduced.

According to another aspect, the present application describes a child safety seat that can be fabricated by a blow molding technique, which is less material-consuming and can reduce the weight of the seat article and number of parts. As a result, shipment and handling operations are more convenient.

Figure 1:
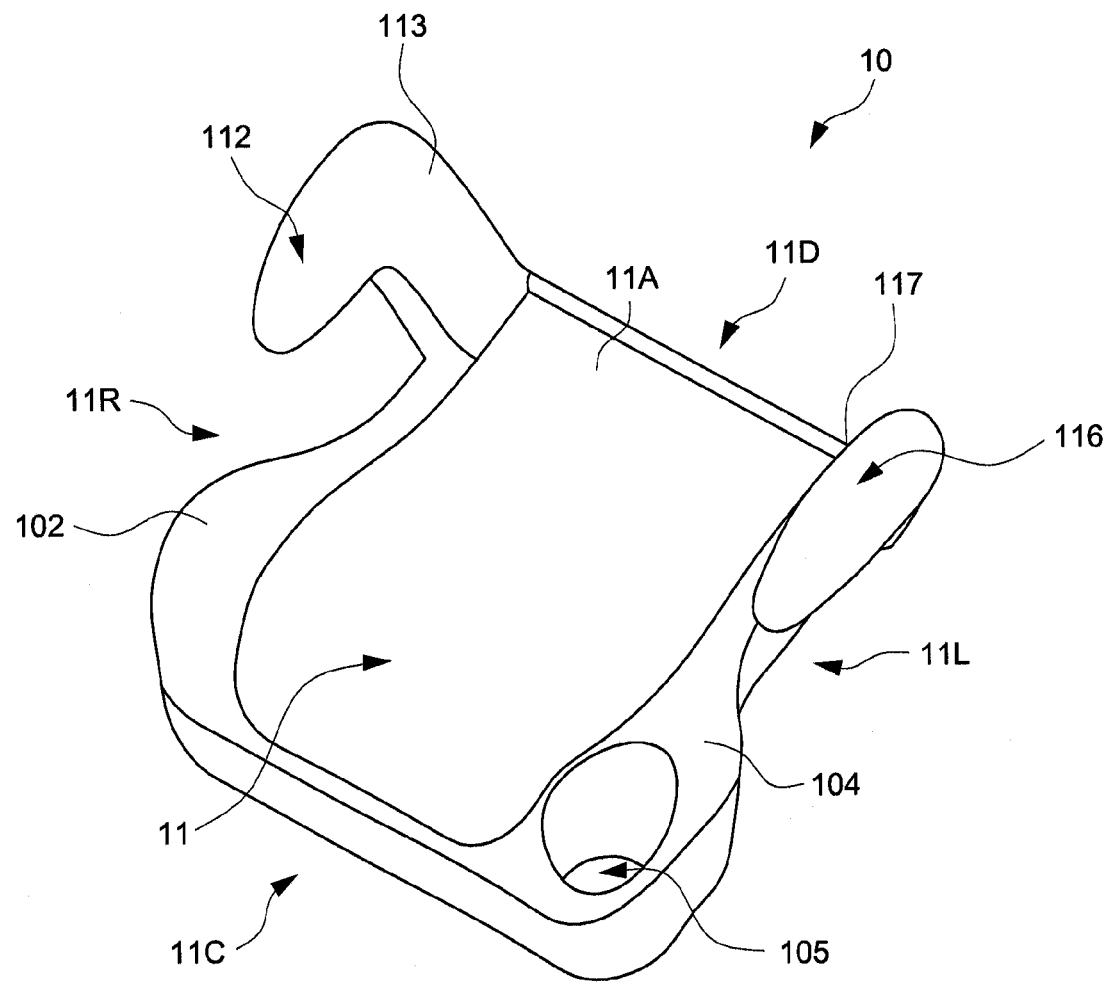
FIG. 1 is a top perspective view illustrating one embodiment of a child safety seat.
Figure 2:
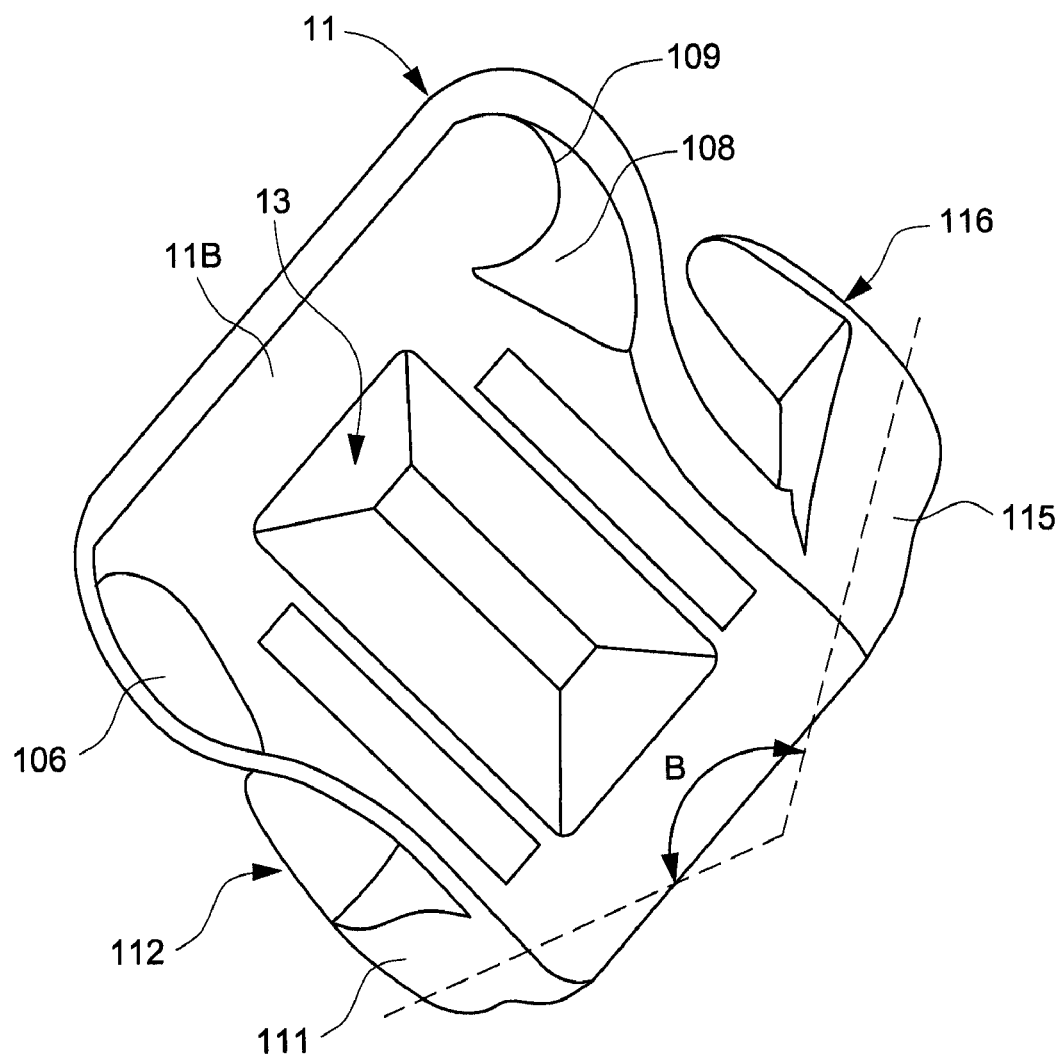
FIG. 2 is a bottom perspective view of the embodiment shown in FIG. 1.
Figure 3:
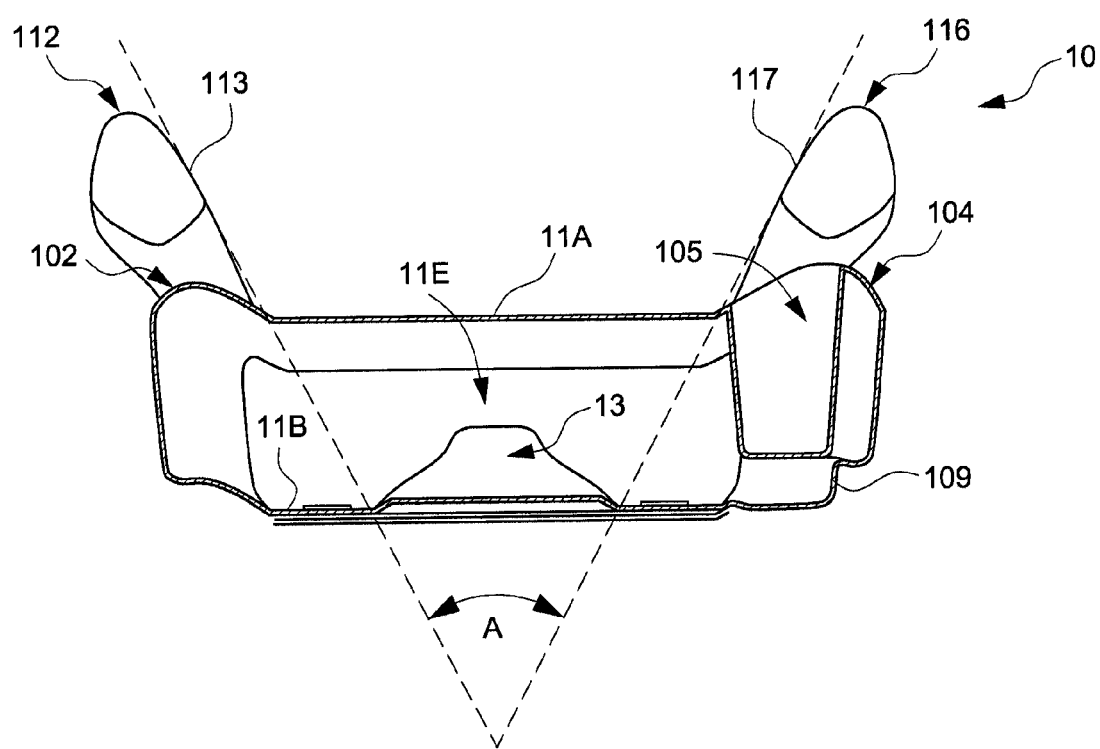
FIG. 3 is a cross-sectional view of the embodiment shown in FIG. 1.

FIGS. 1, 2 and 3 are respectively top perspective, bottom perspective, and cross-sectional views illustrating one embodiment of a child safety seat 10. In one example of implementation, the child safety seat 10 can be made in a single body by blow molding of plastics material. In alternate embodiments, the child safety seat 10 may also be made via other molding techniques. The child safety seat 10 can include a seating portion 11, and two armrests 112 and 116 projecting upward at left and right sides of the seating portion 11.

The seating portion 11 has an upper surface 11A, a lower surface 11B opposite the upper surface 11A, a front 11C, a rear 11D, and right and left sides 11R and 11L. The seating portion 11 can be formed as a centrally hollow body, provided with an inner cavity 11E that is enclosed between the upper surface 11A, lower surface 11B, and right and left sides 11R and 11L. As shown, the rear 11D of the seating portion 11 is not provided with any backrest. However, in alternate embodiments, the rear 11D may also be provided with a backrest portion formed integrally with the seating portion 11.

In addition, the seating portion 11 has a narrower width at the rear 11D, and widens toward the front 11C of the child safety seat 10. The right and left front corners of the upper surface 11A are respectively provided with lobe portions 102 and 104. The lobe portions 102 and 104 may be shaped as protuberances that project laterally outward and also upward from the upper surface 11A. In some embodiment, a cup recess 105 may also be formed proximate or through one or more of the lobe portions 102 and 104 (for example through the lobe portion 104 shown in FIG. 1) for convenient placement of a drinking container or other objects.

Referring to FIGS. 1-3 again, lower ends of the armrests 112 and 116 are respectively joined with the right and left sides 11R and 11L at positions proximate to the rear 11D of the seating portion 11. The armrests 112 and 116 erect upward above the upper surface 11A and are laterally inclined outward. The armrests 112 and 116 can thereby include tapered inner surfaces 113 and 117 that face each other and form a first angle A (as shown in FIG. 3). The upper surface 11A of the seating portion 11 and the tapered inner surfaces 113 and 117 of the armrests 112 and 116 at least partially delimit a seating area for a child. Moreover, the armrests 112 and 116 also respectively have opposite tapered outer surfaces 111 and 115 that form a second angle B (as shown in FIG. 2) substantially matching with the angle A formed by the tapered inner surfaces 113 and 117. In one embodiment, the first and second angles A and B may be substantially equal. In other embodiments, the second angle B may be slightly greater than the first angle A.

As shown in FIG. 2, recessed portions 106 and 108 are respectively formed on the bottom surface 11B of the seating portion 11 at two opposite lateral sides corresponding to the positions of the lobe portions 102 and 104. Each of the recessed portions 106 and 108 has a shape that can fit at least partially with the shape of the corresponding lobe portions 102 and 104. In addition, a region of the bottom surface 11B proximate to one of the recessed portions 106 and 108 (for example, recessed portion 108 shown in FIG. 2) can also include a flange 109. The position of the flange 109 corresponds and is substantially in alignment with that of the cup recess 105. When the seats 10 are stacked on each other, the flange 109 of an upper seat 10 can engage through the cup recess 105 of an immediately adjacent lower seat 10 for promoting anchoring and positioning between the stacked seats 10. A cavity 13 can also be formed at a central region of the bottom surface 11B.

Figure 4:
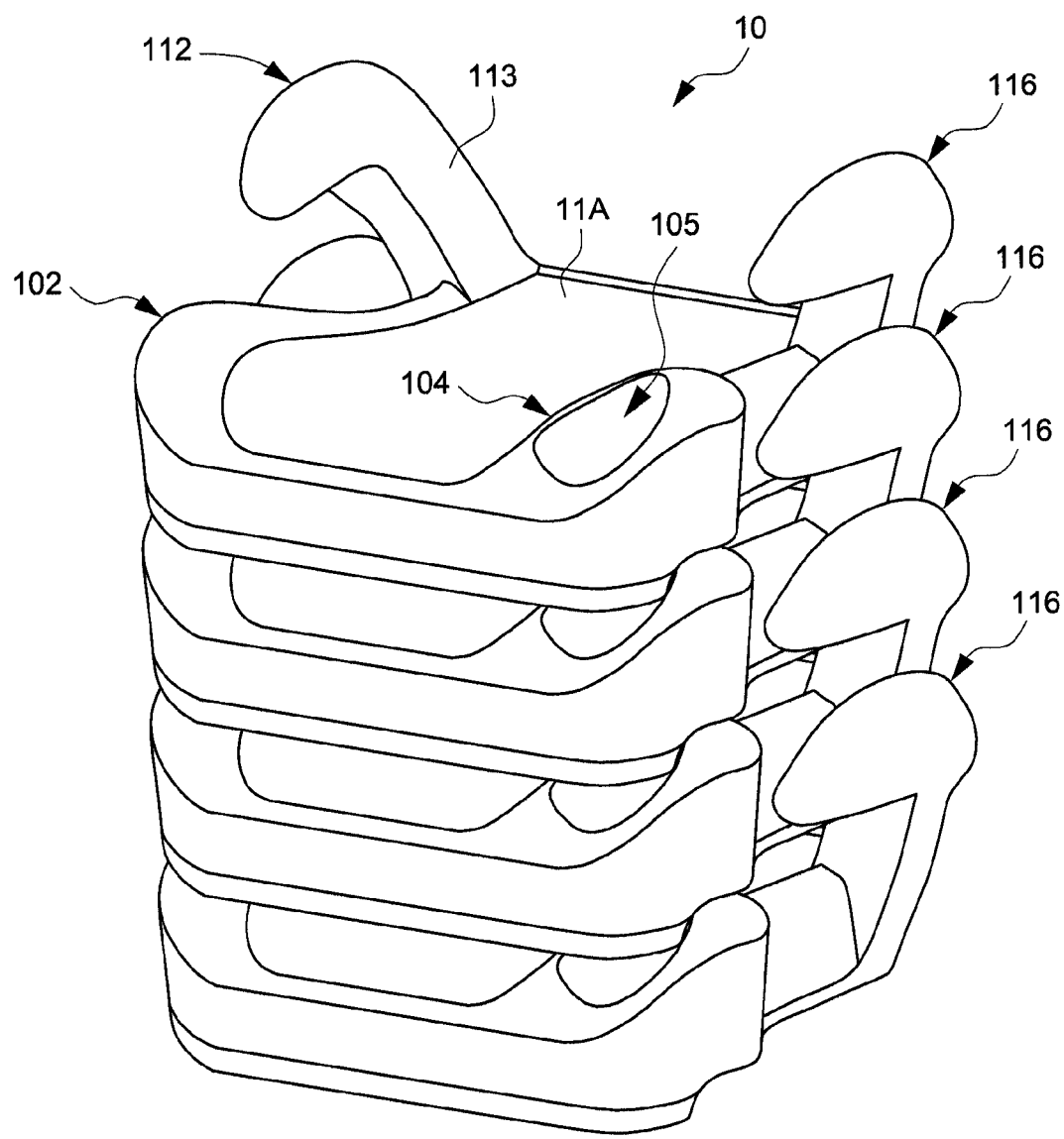
FIG. 4 is a perspective view illustrating multiple child safety seats stacked upon one another.
Figure 5:
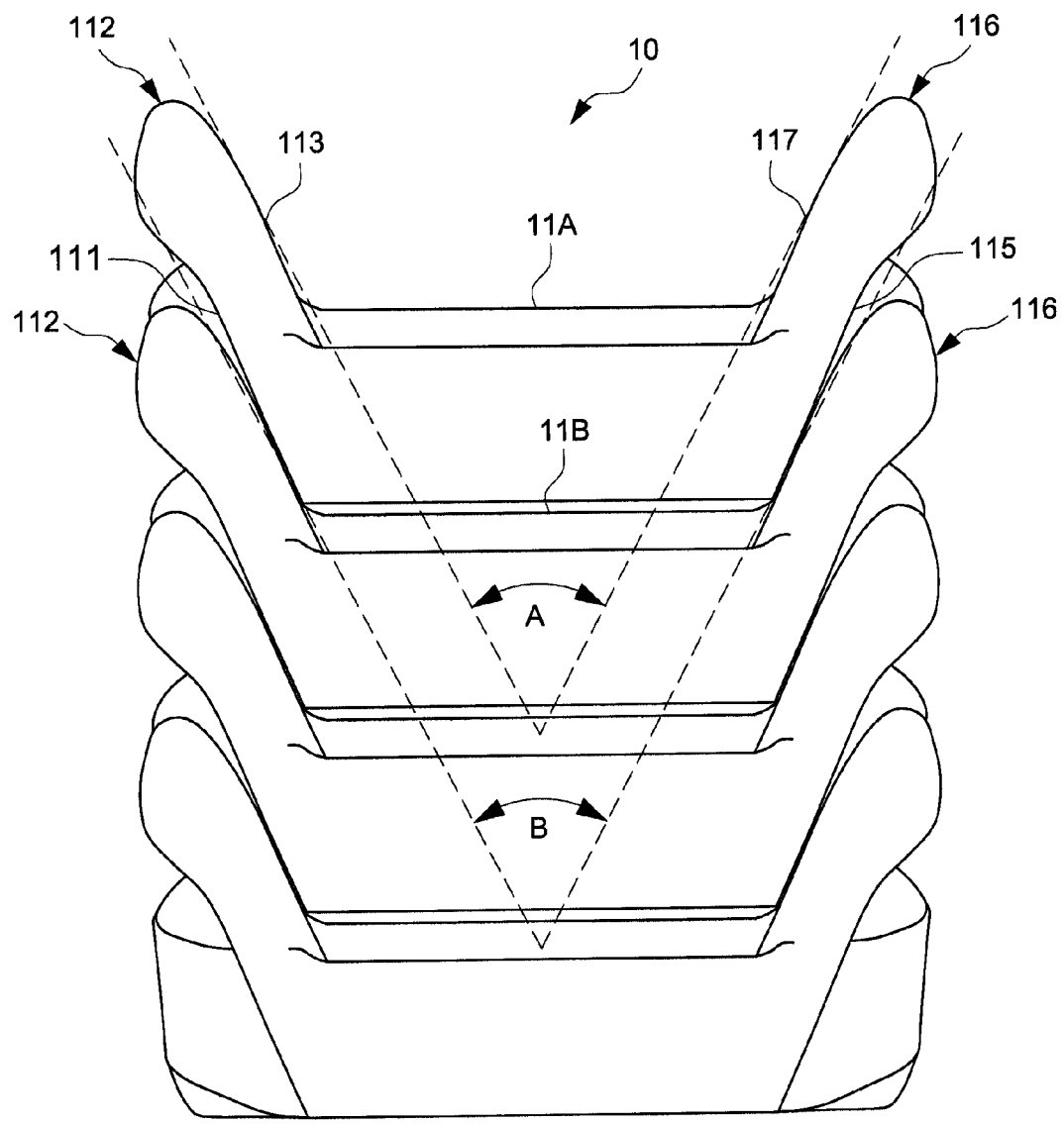
FIG. 5 is a rear view of the stacked seats shown in FIG. 3.
Figure 6:
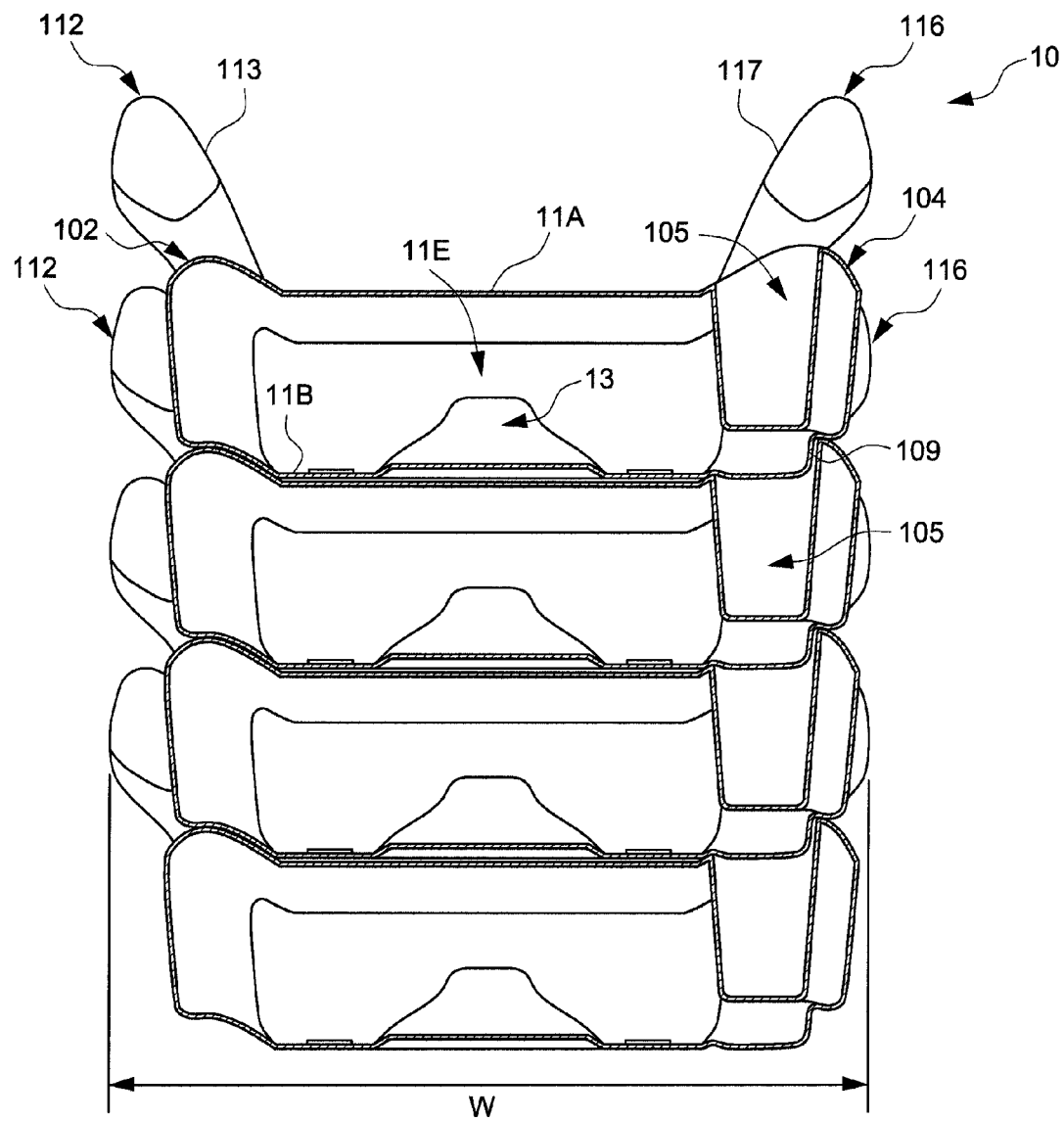
FIG. 6 is a cross-sectional view of the stacked seats shown in FIG. 3.

FIGS. 4-6 are respectively perspective, rear and cross-sectional views illustrating multiple seats 10 stacked vertically upon one another. As shown in FIGS. 3 and 4, two or more seats 10 can be stacked adjacently on each other with the lobe portions 102 and 104 of a lower seat 10 at least partially fitted in the recessed portions 106 and 108 of an immediately adjacent upper seat 10, and the flange 109 of the upper seat 10 at least partially engaged through the cup recess 105 of the lower seat 10. Moreover, as the upper seat 10 is nested in the seating area of the lower seat 10, the tapered outer surfaces 111 and 115 of the upper seat 10 can also be in transition fit or interference fit with the tapered inner surfaces 113 and 117 of the lower seat 10. Consequently, the armrests 112 and 116 of the lower seat 10 can respectively press in an inward direction on the armrests 112 and 116 of the upper seat 10 for engaging the stacked seats 10 in a snug and tight manner. With the engagement between the armrests 112, 116 and the engagement between the recessed portions 106, 108 and lobe portions 102, 104, relative displacement between the stacked seats 10 can be thereby prevented in an effective manner.

For reducing the volume occupied by the stacked seats 10, the bottom surface 11B of the upper seat 10 can also lie proximate and/or in contact with the upper surface 11A of the lower seat 10, while the upper surface 11A of the upper seat 10 can lie at a height that is lower than the top of the armrests 112 and 116. As a result, more seats 10 can be stacked for a given height. The seats 10 once stacked on one another are in substantial alignment, and the whole stack of the seats 10 has a width W that is approximately equal to the width of each individual seat 10.

The above construction can form the seat 10 integrally in a single body at an economical cost, and can facilitate the storage of multiple seats 10 in a stacked manner. At the point of sale, a plurality of seats 10 can therefore be stored within a reduced space stacked on one another. Because the stacked seats 10 are tightly engaged with each other, the occurrence of accidental fall of one or more seats 10 can be reduced, and the whole pile of seats 10 can be handled in a convenient manner.

Figure 7:
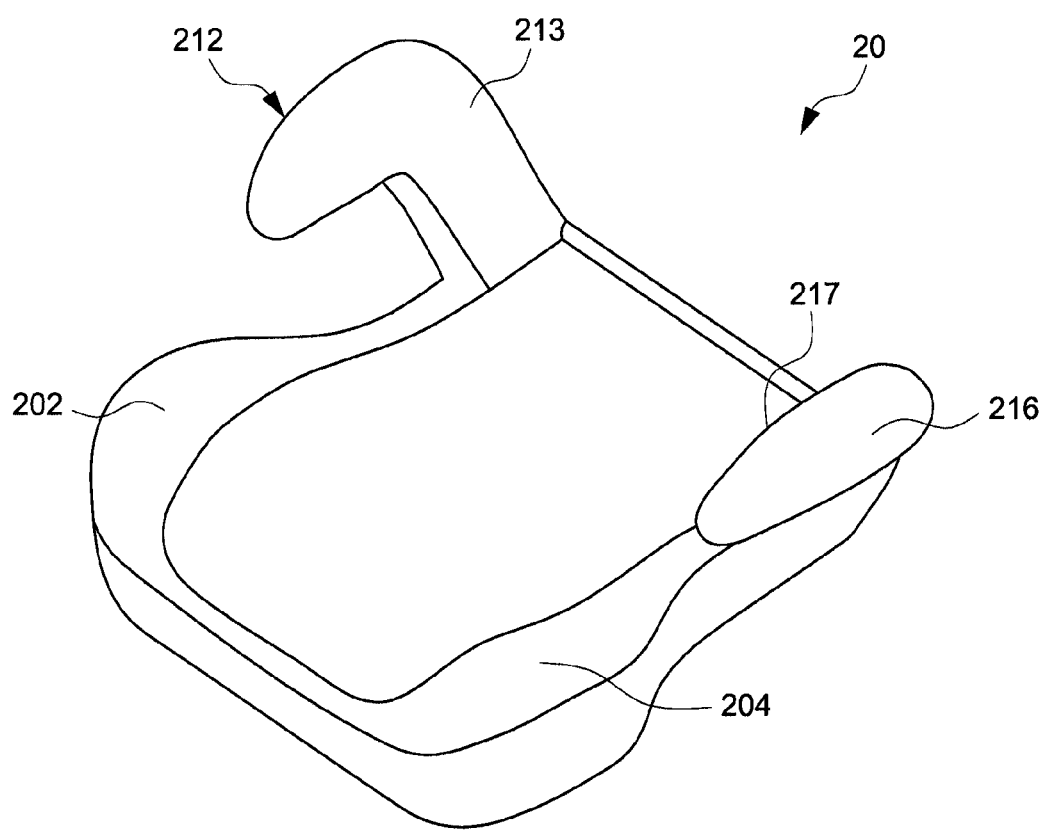
FIG. 7 is a top perspective view illustrating another embodiment of a child safety seat.
Figure 8:
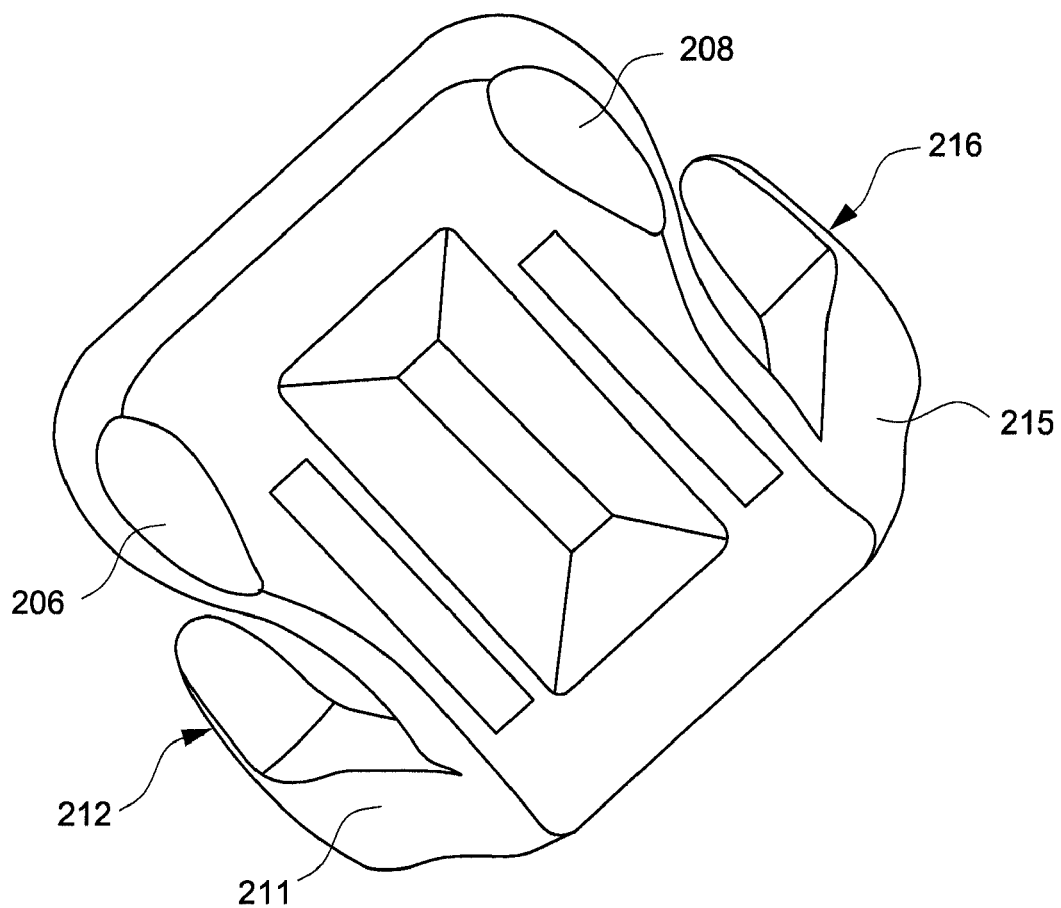
FIG. 8 is a bottom perspective view of the embodiment shown in FIG. 7.

FIGS. 7 and 8 are respectively top and bottom perspective views illustrating another embodiment of a child safety seat 20. The seat 20 differs from the seat 10 in that no cup recess 105 is provided. When the seats 20 are stacked on each other, the lobe portions 202 and 204 projecting upward at the right and left front corners of the lower seat 20 can likewise fit at least partially in the recessed portions 206 and 208 provided on the bottom of the upper seat 20. Moreover, the seat 20 can have armrests 212 and 216 that are formed with tapered inner surfaces 213, 217 and tapered outer surfaces 211, 215 similar to the embodiment previously described. When multiple seats 20 are stacked on one another, the armrests 212 and 216 of an upper seat 20 can likewise press on the armrests 212 and 216 of a lower seat 20 for tightly engaging the stacked seats 20.

At least one advantage of the construction described herein is the ability to stack multiple child safety seats in a convenient manner. Because the stacked seats can engage adjacently with each other in a tight manner, the occurrence of accidental fall of one or more seats can be reduced, and the whole stack of seats can be handled in a convenient manner.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A child safety seat comprising a seating portion having an upper surface and opposite bottom surface, and two armrests projecting upward at left and right sides of the seating portion and respectively including tapered inner surfaces and tapered outer surfaces, the upper surface of the seating portion provided with at least one lobe portion, and the bottom surface having at least one recessed portion respectively corresponding to the location of the lobe portion, wherein the recessed portion has a shape that is adapted to fit with the shape of the lobe portion, and the tapered inner and outer surfaces are configured such that when the child safety seat is stacked on a second child safety seat identical to the child safety seat, the tapered outer surfaces of the armrests on the child safety seat are in transition fit with the tapered inner surfaces of the armrests on the second child safety seat.

2. The child safety seat according to claim 1, wherein the upper surface of the seating portion has left and right front corners, each of the left and right front corner being respectively provided with the lobe portion, and the bottom surface having recessed portions respectively corresponding to the locations of the lobe portions.

3. The child safety seat according to claim 1, wherein the seating portion widens toward a front of the child safety seat.

4. The child safety seat according to claim 1, wherein the armrests are joined with the seating portion at locations proximate to a rear of the child safety seat.

5. The child safety seat according to claim 1, wherein the tapered inner surfaces form a first angle, and the tapered outer surfaces form a second angle substantially matching with the first angle.

6. The child safety seat according to claim 5, wherein the first angle is substantially equal to the second angle.

7. The child safety seat according to claim 5, wherein the second angle is slightly greater than the first angle.

8. The child safety seat according to claim 1, wherein one of the lobe portions includes a cup recess, and a region of the bottom surface includes a flange at a position corresponding to the cup recess.

9. The child safety seat according to claim 1, wherein the body of the child safety seat includes a central cavity that is enclosed at least between the upper and bottom surfaces.

10. The child safety seat according to claim 1, wherein the body of the child safety seat is formed by blow molding.

11. The child safety seat according to claim 1, wherein the child safety seat is formed in a single body.

12. An arrangement of multiple child safety seats, comprising a first and a second seat stacked on each other, wherein each of the first and second seat includes:
- a seating portion having an upper surface and opposite bottom surface, and two armrests projecting upward at left and right sides of the seating portion, the upper surface of the seating portion having left and right front corners respectively provided with lobe portions, the bottom surface having recessed portions respectively corresponding to the locations of the lobe portions, and the armrests respectively include tapered inner surfaces and tapered outer surfaces; and
- wherein the first and second seats are stacked on each other such that the lobe portions of the second seat are respectively fitted at least partially into the recessed portions of the first seat, and the tapered inner surfaces of the armrests on the second seat are in contact with the tapered outer surfaces of the armrests on the first seat.

13. The arrangement of multiple child safety seats according to claim 12, wherein the armrests are joined with the seating portion at locations near a rear of each of the first and second child safety seats.

14. The arrangement of multiple child safety seats according to claim 12, wherein the tapered inner surfaces of each of the first and second seat form a first angle, and the tapered outer surfaces of each of the first and second seat form a second angle substantially matching with the first angle.

15. The arrangement of multiple child safety seats according to claim 14, wherein the first angle is substantially equal to the second angle.

16. The arrangement of multiple child safety seats according to claim 15, wherein the second angle is slightly greater than the first angle.

17. The arrangement of multiple child safety seats according to claim 14, wherein the tapered inner surfaces of the armrests on the second seat press at least partially on the tapered outer surfaces of the armrests on the first seat.

18. The arrangement of multiple child safety seats according to claim 12, wherein one of the lobe portions includes a cup recess, and a region of the bottom surface includes a flange at a position corresponding to the cup recess.

19. The arrangement of multiple child safety seats according to claim 18, wherein the flange of the first seat at least partially engages through the cup recess of the second seat.

20. The arrangement of multiple child safety seats according to claim 12, wherein the bottom surface of the first seat is proximate to the upper surface of the second seat.

21. The arrangement of multiple child safety seats according to claim 12, wherein a body of each of the first and second child safety seat includes a central cavity that is enclosed between at least the upper and bottom surfaces.

22. The arrangement of multiple child safety seats according to claim 12, wherein each of the first and second child safety seats is formed in a single body by blow molding.

* * * * *